United States Patent [19]

Yoshijima et al.

[11] Patent Number: 4,736,956
[45] Date of Patent: Apr. 12, 1988

[54] JOINTING CONSTRUCTION WITH GASKET BETWEEN SURFACES OF TWO MEMBERS WITH DIFFERENT THERMAL EXPANSION COEFFICIENTS AND BONDED TO ONE THEREOF

[75] Inventors: Kazuya Yoshijima, Toyota; Hayakawa Tsutomu, Yamanashi, both of Japan

[73] Assignees: Toyota Jidosha Kabushiki Kaisha, Aichi; Ask Co., Ltd., Tokyo, both of Japan

[21] Appl. No.: 851,449

[22] Filed: Apr. 14, 1986

[30] Foreign Application Priority Data

Apr. 24, 1985 [JP] Japan .............................. 60-61524[U]

[51] Int. Cl.⁴ .............................................. F16J 15/12
[52] U.S. Cl. ........................................ 277/22; 277/26; 277/233; 277/235 B
[58] Field of Search ........... 277/235 R, 235 A, 235 B, 277/236, 227, 228, 233, 22, 26

[56] References Cited

U.S. PATENT DOCUMENTS

| | | | |
|---|---|---|---|
| 2,074,388 | 3/1937 | Gordon | 277/235 B X |
| 3,970,322 | 7/1976 | Stecher et al. | 277/235 A X |
| 4,072,316 | 2/1978 | Decker et al. | 277/235 B |
| 4,201,804 | 5/1980 | Stecher et al. | 277/235 B X |
| 4,402,518 | 9/1983 | Locacius | 277/235 B X |
| 4,434,989 | 3/1984 | Beyer et al. | 277/235 B |

FOREIGN PATENT DOCUMENTS

| | | | |
|---|---|---|---|
| 1921998 | 11/1970 | Fed. Rep. of Germany ... | 277/235 B |
| 3226661 | 1/1984 | Fed. Rep. of Germany ... | 277/235 B |
| 58-24669 | 5/1983 | Japan .............................. | 277/235 B |

*Primary Examiner*—Robert S. Ward
*Attorney, Agent, or Firm*—Parkhurst & Oliff

[57] ABSTRACT

First and second members have substantially different coefficients of thermal expansion, and mutually confronting surfaces. The confronting surface of the first member is covered by a layer of coating material such as protective paint. A jointing construction for jointing between these confronting surfaces includes a gasket sandwiched between the confronting surfaces of the first and the second members, and a layer of bonding material between the gasket and the confronting surface of the second member which bonds the gasket to the second member. Gasket extrusion due to repeated thermal cycling is thereby effectively prevented, and thus this jointing construction with gasket is effective for preventing tearing of the gasket due to extrusion forces acting thereupon, as well as being economical.

4 Claims, 1 Drawing Sheet

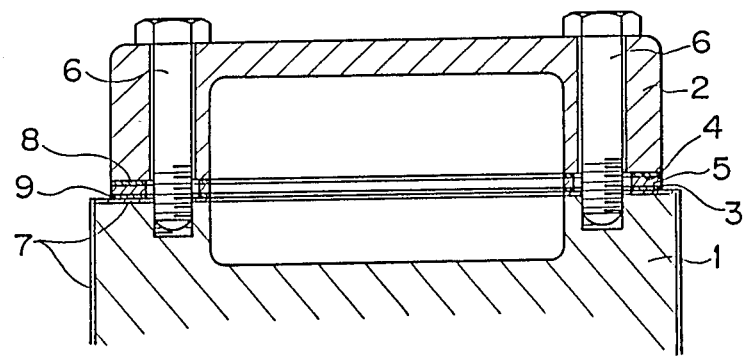

JOINTING CONSTRUCTION WITH GASKET BETWEEN SURFACES OF TWO MEMBERS WITH DIFFERENT THERMAL EXPANSION COEFFICIENTS AND BONDED TO ONE THEREOF

BACKGROUND OF THE INVENTION

The present invention relates to a jointing structure utilizing a gasket, and more particularly relates to such a jointing structure utilizing a gasket which is well adapted for jointing together the mutually confronting surfaces of two members which are made of materials which have different coefficients of thermal expansion, with said gasket sandwiched between said surfaces of said two members, even when a coating material is applied to one of said surfaces of said two members.

Various jointing constructions are per se known in the art for sealing between the mutually confronting surfaces of two members which are made of materials which have different coefficients of thermal expansion. A typical example of two such members with a jointing construction applied thereto is an aluminum alloy cylinder head of an internal combustion engine mounted on a cast iron cylinder block thereof with a sealing head gasket being provided therebetween, since cast iron and aluminum alloy have very different coefficients of thermal expansion. It is very desirable to take into account, in providing any such jointing construction, of the fact that quite often a coating may be applied to one of the surfaces which the gasket is required to be sandwiched between. For example, in the above specified case of an aluminum alloy cylinder head and a cast iron cylinder block of an internal combustion engine, it is per se known and per se very desirable to provide a rust preventive coating material on such a cast iron cylinder block, and in such a case it sometimes happens that the rust preventive coating material in practice gets spread over the upper surface of the cylinder block which is supposed to receive the head, due to practical factors associated with the operation of applying said rust preventive coating material. Any jointing structure is desirably required to be able to cope with such matters.

The following problem has arisen with prior art type jointing constructions for sealing between the mutually confronting surfaces of two members which are made of materials which have different coefficients of thermal expansion, when one of said mutually confronting surfaces of said two members is coated with a coating material. Such a coating material typically has an adhesive power which varies with temperature, and which typically in fact increases with temperature. Suppose that it is the member with the lower coefficient of thermal expansion, hereinafter referred to as the first member, that is the one which is coated with the coating material. Now, when the jointing construction is repeatedly heated and cooled over a long service life, a ratchet effect takes place which tends to force the gasket out from between the confronting surfaces of the two joined members, as follows. When the jointing construction is first heated up, in other words in the initial warming up phase, the coating material is not yet heated up, at least not fully, and accordingly it has a relatively low adhesive strength. Therefore, the outer portions of the gasket are carried along by the relatively greater expansion of the second member somewhat in the outward direction along the coated surface of the first member, which, relatively, allows the outer portions of the surface of the gasket confronting it to slide on it towards its outward portions. On the other hand, when after being warmed up the jointing construction is first cooled down, in other words in the initial cooling down phase, the coating material is still fully heated up, or at least has not fully cooled down, and accordingly it has a relatively high adhesive strength. At this time, therefore, said outer portions of the gasket are relatively firmly held by the adhesive power of the coating to the outer portions of the first member, and accordingly the outward portions of the other surface of the gasket tend relatively to slide on the second member also towards the outside portions thereof, as said second member relatively contracts with respect to the first member. As this process is repeated over many cycles, the gasket is progressively pulled to the outside of the jointing construction. In the extreme case, this can cause tearing of the gasket, and in any case is liable to deteriorate sealing performance. This problem is particularly troublesome in the cited case of cylinder head gaskets for use with cylinder blocks made of cast iron and cylinder heads made of aluminum alloy. A similar but converse problem would arise if it were the member with the higher coefficient of thermal expansion that was the one which was coated with the coating material.

In the prior art, countermeasures adopted to deal with this problem have included dipping of the gasket coupling surfaces into a friction reducing agent including silicon or the like, but complete prevention of gasket extrusion has not been practicable by the use of this method, which accordingly has not been entirely satisfactory.

SUMMARY OF THE INVENTION

Accordingly, it is the primary object of the present invention to provide a jointing construction with gasket between surfaces of two members with different thermal expansion coefficients, which avoids the above described problems.

It is a further object of the present invention to provide such a jointing construction with gasket, which satisfactorily prevents gasket extrusion due to repeated thermal cycling.

It is a further object of the present invention to provide such a jointing construction with gasket, which is effective for preventing gasket tearing due to extrusion forces acting thereupon.

It is a yet further object of the present invention to provide such a jointing construction with gasket, which is economical.

According to the most general aspect of the present invention, these and other objects are accomplished by a jointing construction for jointing between confronting surfaces of first and second members which have substantially different coefficients of thermal expansion, said confronting surface of said first member being covered by a layer of coating material, comprising: (a) a gasket sandwiched between said confronting surfaces of said first and said second members; and (b) a layer of bonding material between said gasket and said confronting surface of said second member which bonds said gasket to said second member. In the present invention, it is desirable to utilize a bonding agent which is of a thermal hardening type and whose bonding strength does not substantially vary once it has been hardened by heating, even if it is subjected to subsequent variations of temperature; and further it is desirable to utilize a gasket which has flexible and elastic properties, so that said gasket can expand and contract along with the thermal expansion and contraction of the aforesaid second member to which it is bonded. Further, it is desirable that a friction reducing agent should be applied between the gasket and the coated surface of the first member, or should be incorporated within the material of said gasket itself.

According to the present invention as described above, although during a period of warming up the gasket is carried along relative to the first member due to differential relative expansion between said first member and said second member together with the surface of the second member to which it is bonded, nevertheless during the subsequent period of cooling down and of reverse relative movement of the confronting surfaces of the first and the second members, although the layer of coating material may have an increased adhesive property due to its higher temperature, the gasket is forcibly carried back along with the second member against the adhesive force of said layer of coating material which is overcome due to the fact that said gasket is bonded to said second member. Accordingly, gasket extrusion due to repeated thermal cycling is effectively prevented, and thus this jointing construction with gasket is effective for preventing tearing of the gasket due to extrusion forces acting thereupon. Further, this jointing construction with gasket is economical.

BRIEF DESCRIPTION OF THE DRAWING

The present invention will now be shown and described with regard to the preferred embodiment thereof, and with reference to the illustrative drawing, which however should not be considered as limitative of the present invention in any way, since the scope of the present invention is to be considered as being delimited solely by the accompanying claims, rather than by any particular features of the disclosed embodiment or of the drawing. The sole FIGURE of the drawing is a vertical sectional view of the preferred embodiment of the jointing construction with gasket according to the present invention.

DESCRIPTION OF THE PREFERRED EMBODIMENT

The present invention will now be described with reference to the preferred embodiment thereof, shown in vertical sectional view in the drawing. In this FIGURE, the reference numeral 1 denotes a first member of relatively low coefficient of thermal expansion, which in this construction is a cylinder block made of cast iron, while the reference numeral 2 denotes a second member of relatively high coefficient of thermal expansion, which in this construction is a cylinder head made of aluminum alloy. The cast iron cylinder block 1 has a flattened surface 3 facing upwards in the figure, and the aluminum alloy cylinder head 2 has a flattened surface 4 facing downwards in the figure and opposing said flattened cylinder block surface 3. The cylinder block 1 is generally covered with a coating 7 of anti-rust paint, which extends over the abovementioned upwardly facing flattened surface 3 thereof. And, as discussed above with reference to the prior art, in the depicted example this type of anti-rust paint has adhesive power which varies with temperature, i.e., increasing with increased temperature. The cylinder block 1 and the cylinder head 2 are clamped together by a plurality of cylinder head fixing bolts 6, only two of which can be seen in the figure.

Between the surfaces 3 and 4 of the cylinder block 1 and the cylinder head 2 there is interposed a gasket 5. This gasket 5 is, in this preferred embodiment, formed of asbestos bonded together by a gum binder, and is flexible and elastic. Particularly according to the present invention, the gasket 5 is bonded to the downwardly facing flattened surface 4 of the aluminum alloy cylinder head 2 by a layer 8 of bonding agent. This bonding agent is preferably of a thermal hardening type whose bonding strength does not substantially change once it has been heated, even if the temperature subsequently varies. Examples of suitable bonding agents include nitro-cellulose, modified alkyd resin, and plasticizer.

Further, in the depicted preferred embodiment of the present invention, although it is not essential to the basic concept thereof, a friction reducing agent including silicon or the like is smeared over the lower surface of the gasket 5 that faces the upwardly facing surface 3 of the case iron cylinder block 1, before the cylinder head 2 and the gasket 5 bonded thereto are fitted onto said cylinder block 1 to be clamped thereon by the cylinder head fixing bolts 6. This layer of friction reducing agent is denoted in the figure by the reference numeral 9.

When the above described jointing construction with gasket is first heated up, in other words in the initial warming up phase with the coating material layer 7 on the cast iron cylinder block 1 not yet fully heated up and accordingly having a relatively low adhesive strength, then, according to the relatively greater expansion amount of the aluminum alloy cylinder head 2 as compared to said cast iron cylinder block 1, as described above, the outer portions of the gasket 5 are carried along by the aluminum alloy cylinder head 2 to which said gasket outer portions are adhered by the bonding agent layer 8, relative to the cylinder block 1 somewhat in the outward direction along the upper surface 3 of said cylinder block 1 with said coating 7 thereon, which at this time allows the outer portions of the surface of the gasket 5 confronting it to slide on it relatively freely towards its outward portions. On the other hand, when after being warmed up the jointing construction is first cooled down, in other words in the initial cooling down phase, although at this time the layer 7 of coating material is still fully heated up or at least has not fully cooled down and accordingly has a relatively high adhesive strength, nevertheless at this time said outer portions of the gasket 5, because said gasket 5 as a whole is very strongly adhered to the under surface 4 of the cylinder head 2 by the layer 8 of bonding agent, are forcibly carried back by said under surface 4 of said cylinder head 2 towards the center portions of the upper surface 3 of said cylinder block 1 with said coating 7 thereon against the adhesive power of said coating layer 7 which, although trying to adhere said outer portions of said gasket 5 to the outer portions of the upper surface 3 of the cylinder block 1, nevertheless is overcome. Accordingly, the outward portions of the lower surface of the gasket 5 are returned to substantially their original positions, as the aluminum alloy cylinder head 2 relatively contracts with respect to the cast iron cylinder block 1. Thus, even if this process is repeated over many cycles, the gasket 5 does not become particularly progressively pulled to the outside of the jointing construction, and accordingly said gasket 5 is not liable to tearing or to deterioration of its sealing performance.

The effect is aided by the provision of the smeared on layer of friction reducing agent 9 on the lower surface of the gasket 5 that thus moves to and fro against the upwardly facing surface 3 of the cast iron cylinder block 1. This layer 9 aids in the sliding of the gasket 5 on the cylinder block 1 during such differential expansion and contraction, by reducing the adhesion force between these two members, no matter what may be the condition of the coating layer 7. However, such a layer 9 of friction reducing agent is not necessary for the practice of the present invention; and such friction reducing agent might alternatively be provided as intermingled with the gasket 5 itself.

In the practice of the present invention, it is desirable to utilize a bonding agent for the layer 8 thereof which is of a thermal hardening type and whose bonding strength does not substantially vary once it has been hardened by heating, even if it is subjected to subsequent variations of temperature. Further, it is desirable to utilize a gasket 5 which has flexible and elastic properties, so that said gasket 5 can expand and contract along with the thermal expansion and contraction of the member (the aluminum alloy cylinder head 2 in the depicted preferred embodiment) to which it is bonded.

Although the present invention has been shown and described in terms of the preferred embodiment thereof, and with reference to the appended drawing, it should not be considered as being particularly limited thereby. The details of any particular embodiment, or of the drawing, could be varied without, in many cases, departing from the ambit of the present invention. Accordingly, the scope of the present invention is to be considered as being delimited, not by any particular perhaps entirely fortuitous details of the disclosed preferred embodiment, or of the drawing, but solely by the legitimate and properly interpreted scope of the accompanying claims, which follow.

What is claimed is:

1. A jointing construction comprising:
   (a) a first member made of a first material and having a first joint surface;
   (b) a second member made of a second material having a larger coefficient of thermal expansion than said first material, said second member having a second joint surface confronting said first joint surface of said first member;
   (c) a coating layer, of a material which repetitively changes between a cold non-adhesive state and a hot adhesive state, provided on said first joint surface of said first member;
   (d) a gasket sandwiched between said first joint surface of said first member, coated with said coating layer, and said second joint surface of said second member; and
   (e) a layer of thermally hardening bonding material between said gasket and said second joint surface of said second member for thermally bonding said gasket to said second member.

2. A jointing construction according to claim 1, wherein said bonding material is selected from the group consisting of nitro-cellulose, modified alkyd resin and plasticizer.

3. A jointing construction according to claim 1, wherein said coating material is an anti-rust paint.

4. A jointing construction according to claim 1, wherein said first member is a cylinder block made of cast iron and said second member is a cylinder head made of an aluminum alloy.

* * * * *